US007668345B2

(12) United States Patent
Kiyohara et al.

(10) Patent No.: US 7,668,345 B2
(45) Date of Patent: Feb. 23, 2010

(54) IMAGE PROCESSING APPARATUS, IMAGE PROCESSING SYSTEM AND RECORDING MEDIUM FOR PROGRAMS THEREFOR

(75) Inventors: Masahiro Kiyohara, Hitachi (JP); Masato Kazui, Pittsburgh, PA (US); Kazunori Takahashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 265 days.

(21) Appl. No.: 11/392,688

(22) Filed: Mar. 30, 2006

(65) Prior Publication Data

US 2006/0222213 A1 Oct. 5, 2006

(30) Foreign Application Priority Data

Mar. 31, 2005 (JP) ............................. 2005-100478

(51) Int. Cl.
*G06K 9/00* (2006.01)
(52) U.S. Cl. ..................................................... 382/115
(58) Field of Classification Search ....................... None
See application file for complete search history.

(56) References Cited

U.S. PATENT DOCUMENTS 5,402,339 A * 3/1995 Nakashima et al. ............. 707/1
5,467,441 A * 11/1995 Stone et al. .................. 345/619
5,870,138 A * 2/1999 Smith et al. .................. 348/143
6,005,936 A * 12/1999 Shimizu et al. .............. 713/176
2002/0001398 A1* 1/2002 Shimano et al. ............. 382/104
2004/0081338 A1* 4/2004 Takenaka .................... 382/118

FOREIGN PATENT DOCUMENTS

| JP | 7-282227 | 10/1995 |
| JP | 2003-141546 | 5/2003 |
| JP | 2003-242486 | 8/2003 |
| JP | 2004-62560 | 2/2004 |

* cited by examiner

*Primary Examiner*—Brian P Werner
*Assistant Examiner*—Elisa M Rice
(74) *Attorney, Agent, or Firm*—Antonelli, Terry, Stout & Kraus, LLP

(57) ABSTRACT

An image processing apparatus, for example, a multi-camera monitoring system is provided for processing images with the intention of protecting the individuals' privacies in accordance with the type of customers in a store which is equipped with the multi-camera monitoring system, and for deleting or modifying individuals' privacy information to protect the individuals' privacies while permitting the identity of a person to be determined among a plurality of cameras. The image processing apparatus processes an image captured by an imager device to output the resulting image. A processor detects a person from an image, and an image database stores feature information on the person. The processor extracts features from the detected person and the database, processes the extracted feature amount in the stored feature information, and generates an output image based on the processed features.

11 Claims, 8 Drawing Sheets

IMAGE PROCESSING APPARATUS, IMAGE PROCESSING SYSTEM AND RECORDING MEDIUM FOR PROGRAMS THEREFOR

BACKGROUND OF THE INVENTION

The present invention relates to an image processing apparatus and system for processing images captured by monitoring cameras, and a recording medium for programs therefore, and more particularly, to an image processing apparatus and system for processing part or entirety of images for protecting individuals' privacies, and a recording medium for storing programs therefore.

In a multi-camera monitoring system represented by monitoring of suspicious persons and person flow measurements in stores, monitor images are typically sent to a centralized management center through a network for monitoring by guards in real time and for recording and storage of the images on a video tape and a hard disk recorder (hereinafter called the "HDR"). The guards rely on such monitor images to monitor a store for a suspicious person who stays at the same location in the store for a long time, or suspicious persons who stay at a plurality of locations in the store for a long time, and rush a guard on patrol to an area under monitoring, if necessary, to ensure the security in the area under monitoring. However, if these monitor images leak out of an enterprise, the enterprise has the risk of lower creditability and reparation problem, so that individuals' privacies associated with the right of portrait must be protected in such monitor images as well.

For addressing the foregoing problem, JP-A-2004-62560 entitled "Face Matching Apparatus and Face Matching Method" (OMRON Corporation) proposes means for protecting person's privacy by matching previously registered face images with face images in inputted monitor images to tessellate face areas within the monitor images if no match is found.

Also, JP-A-2003-242486 entitled "Personal Attribute Estimating Apparatus" (Softpia Japan Foundation) proposes means for estimating attributes such as sex, age and the like of persons, the faces of which appear in an inputted monitor image. This means matches features in faces of persons manually classified and registered beforehand according to the attributes with the features of face images within an inputted monitored image to detect face areas in the inputted image, and estimate the attributes of the face images such as sex and age.

SUMMARY OF THE INVENTION

The multi-camera monitoring system must identify a person captured by a certain camera even when this person is captured by another camera.

JP-A-2004-62560 describes means for tessellating a face area in order to protect the individual's privacy. In this event, the same person can be identified in the aforementioned situation by applying weak tessellation to a face area, but the person can be estimated from the tessellated image, resulting in a high likelihood of encroaching the person's privacy. Conversely, strong tessellation applied to a face area would enhance the protection for individual's privacy, but cause difficulties in determining the identity of a person among a plurality of cameras, as well as degrade the quality of monitor images, hard to see even for monitoring persons, thus resulting in an increased burden on the monitoring persons. As described above, in the multi-camera monitoring system, simple tessellation of images does not work well for the privacy protection.

The present invention is intended to extract features of a face image from a monitor image, and automatically process the image in accordance with the features to accomplish both the privacy protection and the determination of the identity of a person among a plurality of cameras.

JP-A-2003-242486 describes a method of extracting features of a face image. This method previously classifies face images manually according to attributes, which one wishes to extract, registers the face images on an attribute-by-attribute basis, and calculates their feature amounts. Upon entry of an image which one wishes to classify, a feature amount is calculated for the image, a degree of similarity is calculated between previously registered feature amounts of the images and the calculated feature amount, and the attribute having the highest degree of similarity is estimated as an attribute of the input image. However, a large cost is implied in the previous manual classification and registration of a large amount of face images, and difficulties are encountered in changing the classification of attributes in accordance with the grade of customers in each store. For this reason, the multi-camera monitoring system is not suitable for application in such stores which are visited by a particular grade of customers, because the classification of attributes can result in the same values.

It is an object of the present invention to process images for protecting the individuals' privacies in accordance with the type of customers in a store which is equipped with a multi-camera monitoring system, and to delete or modify individuals' privacy information to protect the individuals' privacies while permitting the identity of a person to be determined among a plurality of cameras.

To solve the problems mentioned above, according to one aspect the present invention, an image processing apparatus for processing an image captured by an imager device to output the processed image is provided, which comprises means for detecting a person within an image, means for storing feature information in a database, means for extracting features from the person detected by the detecting means and the database, means for processing a feature amount extracted by the extracting means within the stored feature information, and means for generating an output image based on the processed features.

In the image processing apparatus described above, the means for detecting a person detects the head of a person.

In the image processing apparatus described above, the feature extracted from a detected person includes one or more of face image, sex, age, age group, hair style, clothing, skin color, hair color, color of closing, shape of the head, whether the person wears glasses, whether the person wears a face mask, whether the person wears accessories, whether the person has a mole, shape of mustache, and mustache color.

In the image processing apparatus described above, the feature extracted from a detected person is represented by a feature element within the database which stores feature information.

The image processing apparatus described above further includes means having a plurality of databases recorded thereon for storing feature information and switching the databases.

The image processing apparatus described above further includes means for switching the database for storing feature information such that part or entirety of the database is utilized.

In the image processing apparatus described above, the database for storing feature information is recorded in an exchangeable computer-readable recording medium.

In the image processing apparatus described above, the means for processing a feature amount includes processing for replacing the feature amount with a value calculated from the feature amount using a function.

In the image processing apparatus described above, the function of calculating a value to be substituted for the feature amount receives a time or an operating time of the apparatus as an input parameter, and a value calculated with the same feature amount inputted to the means varies depending on the time or the operating time of the apparatus.

In the image processing apparatus described above, the function of calculating a value substituted to be for the feature amount can be manually changed to change the value calculated with the same feature amount inputted to the means.

Further, to solve the problems mentioned above, the present invention provides a computer-readable recording medium which stores a program that includes a function of detecting a person from an image, a function of storing feature information for use as a database, a function of extracting features from a person detected by the detecting function and from the database, a function of processing the feature amount extracted by the extracting function in the stored feature information, and a function of generating an output image based on the processed features.

Further, to solve the problems mentioned above, the present invention provides a computer-readable recording medium which stores a program that includes a function of detecting a person from an image, a function of storing feature information for use as a database, a function of switching a plurality of databases recorded for storing feature information, a function of extracting features from a person detected by the detecting function and from the database, a function of processing the feature amount extracted by the extracting function in the stored feature information, and a function of generating an output image based on the processed features.

Further, to solve the problems mentioned above, the present invention provides a computer-readable recording medium which stores a program that includes a function of detecting a person from an image, a function of storing feature information for use as a database, a function of switching the database for storing feature information to utilize part or entirety of the database, a function of extracting features from a person detected by the detecting function and from the database, a function of processing the feature amount extracted by the extracting function in the stored feature information, and a function of generating an output image based on the processed features.

Further, to solve the problems mentioned above, the present invention provides a computer-readable recording medium which stores a program that includes a function of detecting a person from an image, a function of storing feature information for use as a database, a function of extracting features from a person detected by the detecting function and from the database, a function of switching a transform function for processing a feature amount, a function of processing the feature amount extracted by the extracting function in the stored feature information using the transform function, and a function of generating an output image based on the processed features.

Further, to solve the problems mentioned above, the present invention provides an image processing system for processing an image captured by an imager device to output the processed image. The system is configured to detect a person from an image, extract features from a person detected by the detecting function and from a database for storing feature information, process the extracted feature amount in the stored feature information, and generate an output image based on the processed features.

Further, to solve the problems mentioned above, the present invention provides an image processing system for processing an image captured by an imager device to output the processed image. The system is configured to detect a person from an image, select one or a plurality of databases for utilization from among a plurality of databases for storing feature information, extract features from a person detected by the detecting function and the database for storing feature information, process the extracted feature amount in the stored feature information, and generate an output image based on the processed features.

Further, to solve the problems mentioned above, the present invention provides an image processing system for processing an image captured by an imager device to output the processed image. The system is configured to detect a person from an image, select a data range to be utilized in a database for storing feature information, extract features from a person detected by the detecting function and from the database, process the extracted feature amount in the stored feature information, and generate an output image based on the processed features.

Also, to solve the problems mentioned above, the present invention provides an image processing system for processing an image captured by an imager device to output the processed image. The system is configured to detect a person from an image, extract features from a person detected by the detecting function and a database for storing features, switch a transform function for processing a feature amount, process the extracted feature amount in the stored feature information using the transform function, and generate an output image based on the processed features.

According to the embodiments of the present invention, in a multi-camera monitoring system, for example, individuals' privacies can be protected by processing images with the intention of protecting the individuals' privacies in accordance with the grade of customers in a store which is equipped with the system, and deleting or modifying individuals' privacy information while permitting the identity of a person to be determined among a plurality of cameras.

Other objects, features and advantages of the invention will become apparent from the following description of the embodiments of the invention taken in conjunction with the accompanying drawings.

DESCRIPTION OF THE EMBODIMENTS

In the following, the present invention will be described in connection with several embodiments.

First Embodiment

An image processing apparatus and method according to a first embodiment of the present invention will be described with reference to the accompanying drawings.

Figure 1:
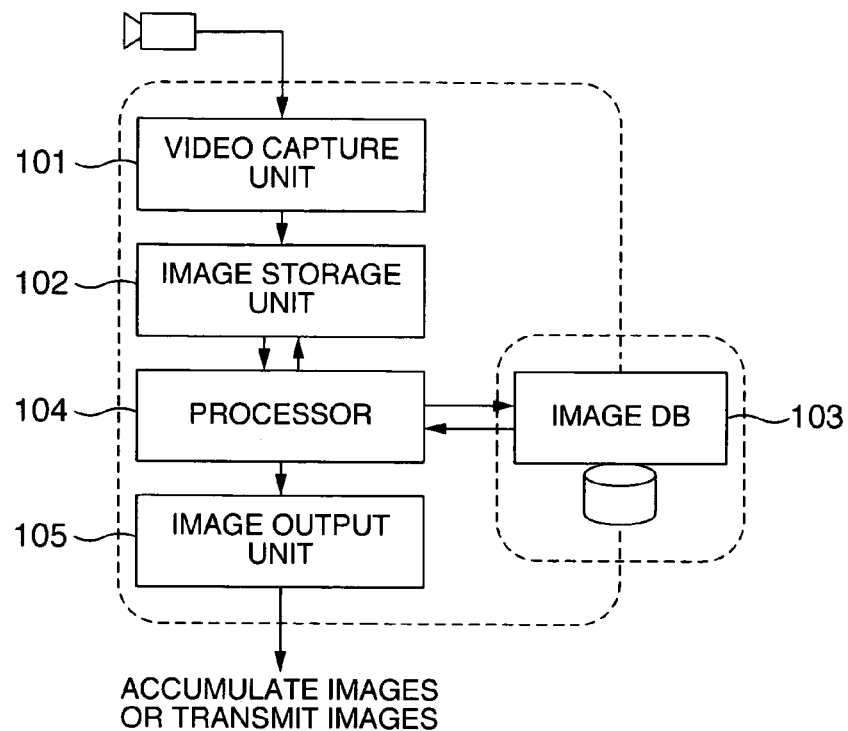
FIG. 1 is a block diagram generally illustrating the configuration of a first embodiment according to the present invention.

FIG. 1 is a block diagram generally illustrating the image processing apparatus according to the first embodiment of the present invention.

In FIG. 1, the image processing apparatus comprises a video capture unit 101, an image storage unit 102, an image database (hereinafter called the "DB") 103, a processor 104, and an image output unit 105.

Image data sent from an imager device is captured by the video capture unit 101. For example, when the image data is an analog signal, the image data is periodically converted to a digital signal using an A/D converter before it is sent to the image storage unit 102. When the image data is a digital signal, the digital data is communicated from the imager device, and corrected for possible errors to create digital data which is then sent to the image storage unit 102.

In the image storage unit 102, the image data sent from the video capture unit 101 is stored in a temporary storage medium such as a memory, such that the stored data is read therefrom in response to a request from the processor 104.

The image database 103 records image data itself, or a collection of feature data resulting from image processing performed on the image data, such that the stored data is read therefrom in response to a request from the processor 104. By exchanging the image database 103, different processing can be performed on the image data stored in the image storage unit 102 by the processor 104.

The processor 104 generates an output image using image data stored in the image storage unit 102, and image data or feature data stored in the image database 103, and sends the output image to the image output unit 105.

The image output unit 105 converts the output image sent from the processor 104 to an analog signal using a D/A converter to generate video data for display. Alternatively, the output image is converted into a format suitable for transmission on a network, and transmitted to another device.

Figure 2:
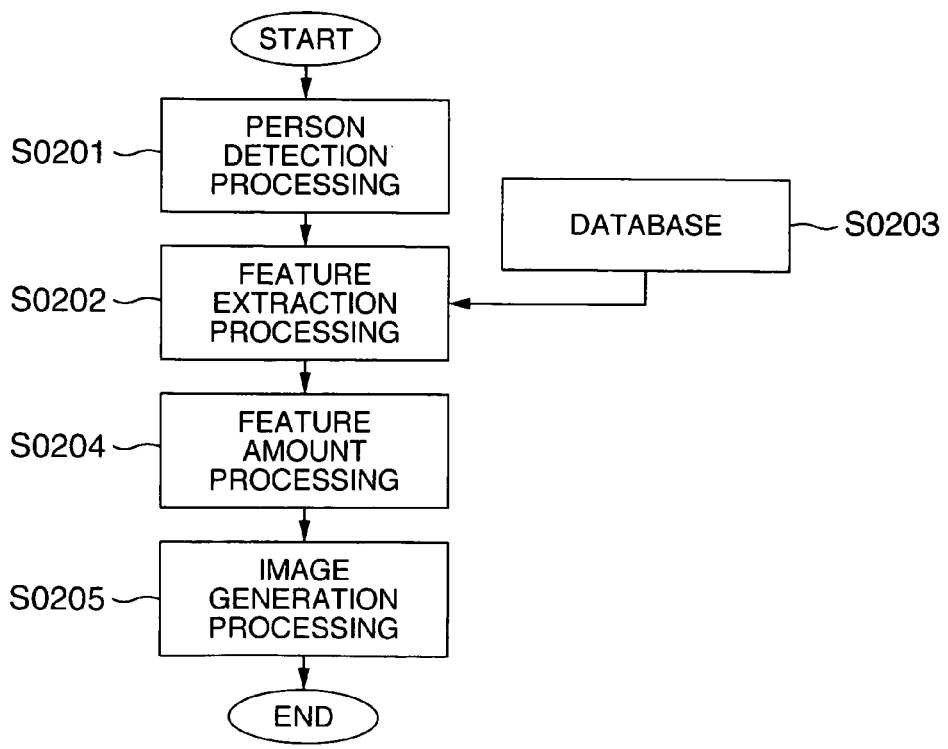
FIG. 2 is a flow chart illustrating the flow of processing in a processor unit in the first embodiment.

In the following, the flow of processing performed by processor 104 will be described in detail. FIG. 2 is a flow chart illustrating the flow of processing performed by the processor 104.

The flow of the processing performed in the processor 104 will be described with reference to FIG. 2.

In FIG. 2, the processing procedure comprises a person detection processing step 0201, a feature extraction processing step 0202, a feature amount processing step 0204, and an image generation processing step 0205.

FIGS. 3 to 6 are explanatory diagrams showing details of the person detection processing step 0201.

Figure 3:
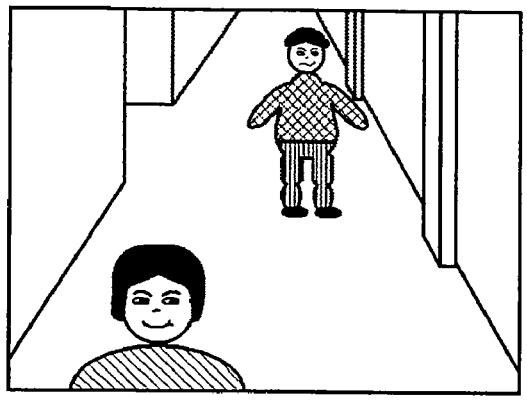
FIG. 3 is a diagram illustrating an image stored in an image storage unit.
Figure 4:
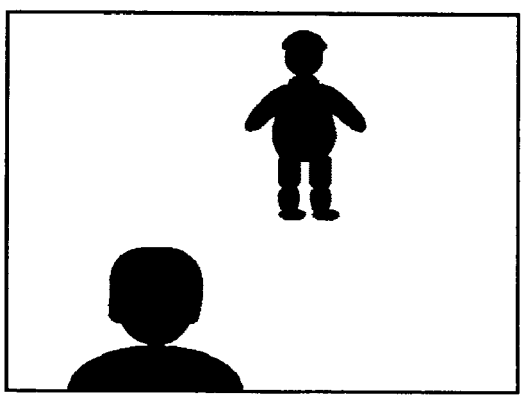
FIG. 4 is a diagram showing the result of detecting person areas.

FIG. 3 illustrates an image stored in the image storage unit 102, and FIG. 4 shows an image resulting from detection of person areas from this image.

Figure 6:
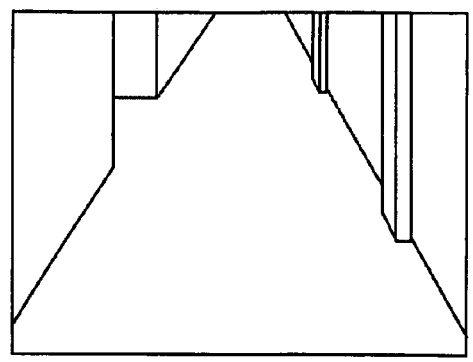
FIG. 6 is a diagram illustrating a background image.

The detection of person areas may involve, previously imaging a background image when no person is present within an imaging range, for example, as illustrated in FIG. 6, taking differences between the inputted image of FIG. 3 and the background image, smoothing the resulting image in order to restrain the influence of noise, digitizing the smoothed image with a certain threshold, integrating and labeling as spatially linked region in the meaning of four linked or eight linked segments, and selecting the region having a high likelihood as persons from the size and shape of the region.

Alternatively, for the inputted image of FIG. 3, after a radial reach filter (see JP-A-2003-141546 entitled "Image Processing Method," Softpia Japan Foundation) generates an RRF image between the background image and the inputted image, isolated points may be removed for restraining the influence of noise, to detect an object area, which has been newly intruded into the imaging area, as a person area. Further alternatively, a circumscribed rectangular area of an object area newly intruding into the imaging area may be detected as a person area.

Figure 5:
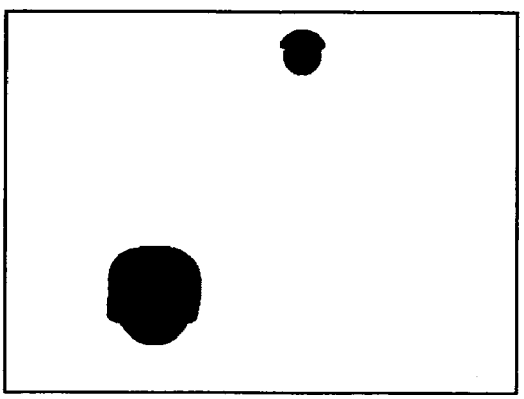
FIG. 5 is a diagram showing the result of detecting head areas of persons.

The person detection processing step S0201 may detect a person by paying attention only to a head area of the person, instead of detecting a person area. FIG. 5 illustrates an image resulting from the detection of person head areas in FIG. 3.

A person head area is detected, for example, by detecting a contrast edge using a Sobel filter or a Laplace filter for an inputted image, and performing a Hough transform based on the detected edge point to detect a circle or oval head area. Alternatively, there is a method which marks off a rectangular area, which is a candidate for a face, from the inputted image of FIG. 3, measures a projection of a contrast value in the x-axis (horizontal axis) direction for the rectangular area, and compares a first-order differentiation value of the projection with its statistic value to detect a face area (see JP-A-7-282227 entitled "Person Face Area Detector" (Toshiba Corporation).

Next, the feature extraction processing step 0202 will be described.

Figure 7:
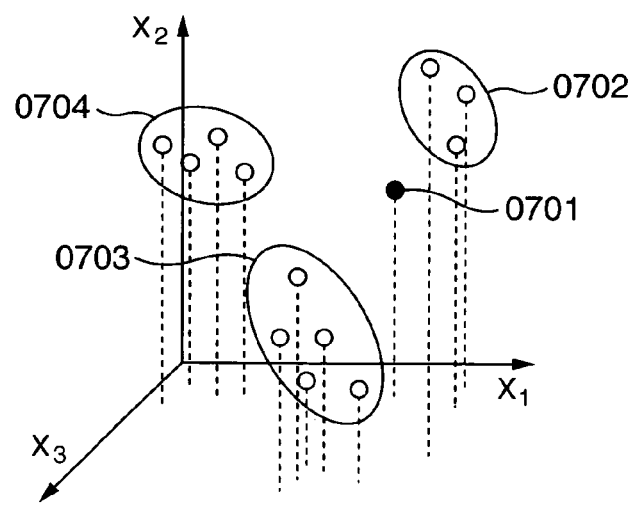
FIG. 7 is a diagram showing a database.

FIG. 7 shows details of the image database step 0203.

FIG. 7 shows person data 0701 detected at the person detection processing step 0201, and a collection of person data 0702, 0703, 0704 included in the image database.

The term "feature" used herein means a multi-dimensional vector as a coordinate of a point corresponding to the person's attributes in the inputted image in a multi-dimensional space which is reflected in a distribution of person's attributes of a referenced collective person image. Alternatively, instead of directly utilizing an image, a collection of persons and an inputted person area may be subjected to known image processing such as edge extraction, local autocorrelation, projective transform or the like, and the result may be utilized.

Also, when detected person data differs from person data included in the database in image size and contrast or the size and value range of the image processing result, normalization is performed because the feature extraction and processing are difficult to perform.

Features are extracted by calculating a vector of an image of the person area detected at the person detection processing step 0201 within the distribution of the image database 103 which accumulates person images. This vector is calculated by a principal component analysis (PCA), an eigenvalue calculation or the like for the image database. Thus, extracted features vary by exchanging the previously prepared image database 103. The principal component analysis or eigenvalue calculation may be made only on the image database 103 or on the database and detected person data.

As a result, a feature vector is calculated with feature axes representing elements which largely vary in appearance among person data within the database, for example, face image, sex, age, age group, hair style, closing, skin color, hair color, color of closing, shape of head, differences in expression when a person wears glasses or not, when the person wears a face mask or not, or when the person wears accessories or not, or when the person has moles or not, and the like.

FIGS. 8 to 11 are explanatory diagrams showing details of the feature amount processing step 0204.

Figure 8:
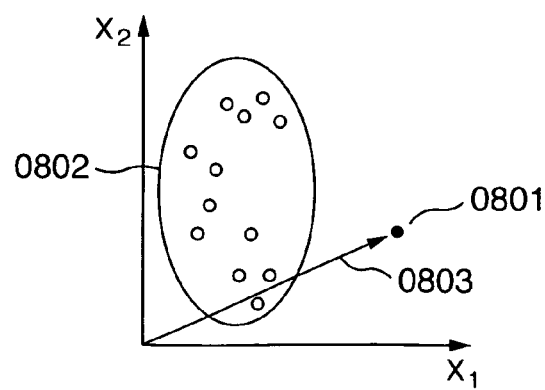
FIG. 8 is a diagram representing person data resulting from person detection processing within a distribution of person data included in the database.

FIG. 8 shows person data 0801 detected by the person detection processing step 0201, and a collection 0802 of person data included in the image database. In addition, a feature vector 0803 is represented in correspondence to the person data 0801.

The feature vector 0803 represents a difference between the person data 0801 and other person data, so that if the feature vector 0803 is processed so as not to distinguish it from the other person data 0802, it can be said that features are removed. Thus, by exchanging the previously prepared image database 103 which is a collection of other person data 0802, different features are removed.

Figure 9:
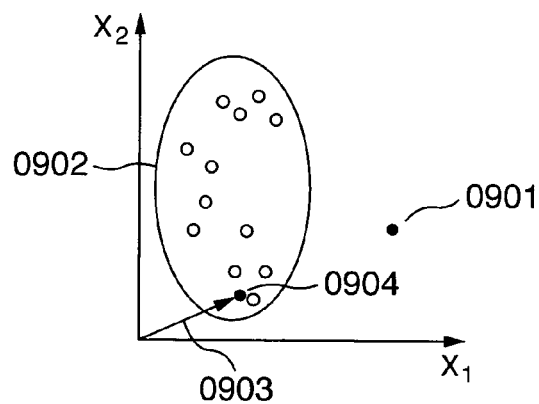
FIG. 9 is a diagram showing how a feature vector is processed to change its length.

FIG. 9 represents person data 0904 and a transformed feature vector 0903 when the length of the vector is changed in scale such that the person data 0901 is included in the distribution of the collection 0902 of other person data.

This results in removal of characteristic elements of the detected person data, for example, such features as sex, age, age group, hair style, closing, skin color, hair color, color of closing, shape of head, differences in expression when a person wears glasses or not, when the person wears a face mask or not, or when the person wears accessories or not, or when the person has moles or not, and the like. In this way, individual's privacy information is processed.

Next, the image generation processing step 0205 will be described.

In the image generation processing step 0205, an image area is generated from the features removed in the feature amount processing step 0204 by adjusting the size and contrast such that the resulting image area fits to the person area or person's head area detected in the person detection processing step 0201. Then, this image area is combined with the image stored in the image storage unit 102 to overwrite the individual's privacy information, thereby generating an image to be outputted.

Figure 12:
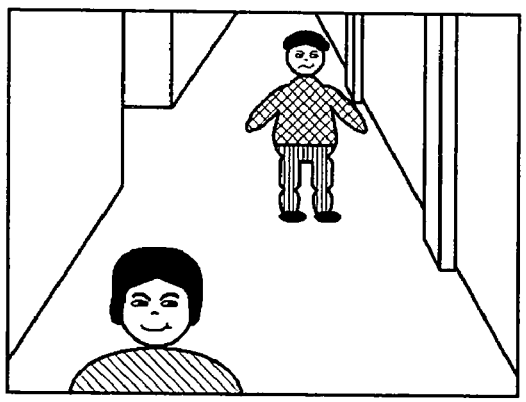
FIG. 12 is a diagram illustrating an image stored in the image storage unit.

FIG. 12 is a diagram illustrating an image stored in the image storage unit 102.

Figure 13:
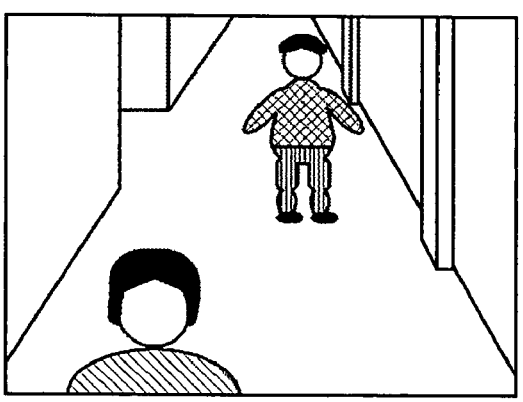
FIG. 13 is a diagram illustrating an image in which personal features are deleted.

FIG. 13 is a diagram illustrating an image which is generated by detecting the images of faces, which constitute persons' features, in the person detection processing step 0201, extracting entire face images as features in the feature extraction processing step 0202, deleting the entire extracted features in the feature amount processing step 0204, combining the resulting image with the image stored in the image storage unit 102, and deleting the face images which constitute individuals' privacies.

Figure 15:
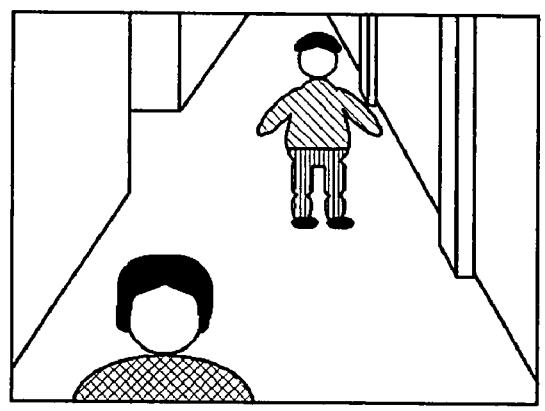
FIG. 15 is a diagram illustrating an image in which personal features are both deleted and replaced.

FIG. 15 is a diagram illustrating an image which has undergone deletion of face images simultaneously with a change in clothing.

Second Embodiment

While a second embodiment is substantially similar to the first embodiment, a feature amount representative of individual's features is replaced with a feature amount representative of another feature to change the appearance on a monitor image, instead of deleting individual's privacy information by deleting individuals' features and substituting a representative feature amount therefore. Specifically, by replacing a feature amount representative of the length of hair with a feature amount representative of the depth of skin color, a person who has features of long hair and fair complexion, for example, is transformed as if the person has features of short hair and dark complexion.

In the following, details of the feature amount processing step 0204 in this embodiment will be described with reference to FIGS. 8 to 11.

FIG. 8 shows person data 0801 detected by the person detection processing step 0201, and a collection 0802 of person data included in the image database. In addition, a feature vector 0803 is represented in correspondence to the person data 0801.

Figure 10:
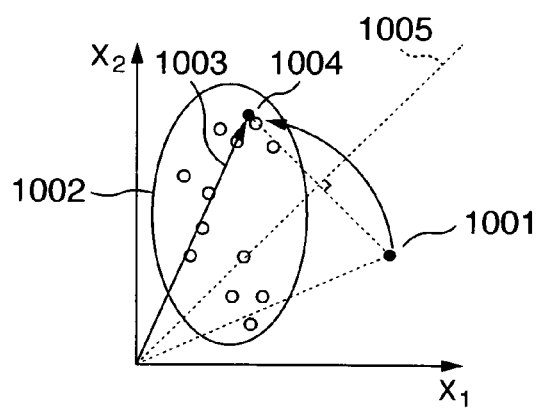
FIG. 10 is a diagram showing how a feature vector is transformed to be symmetric with respect to a hyperplane.
Figure 11:
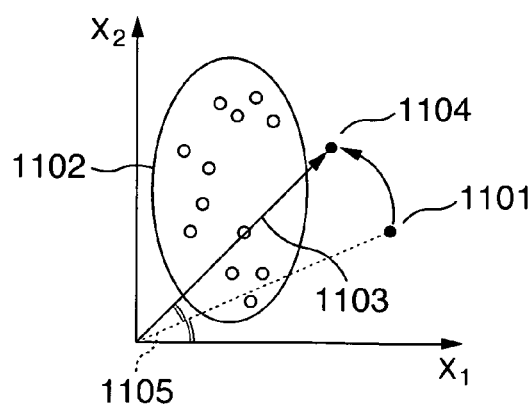
FIG. 11 is a diagram showing how a feature vector is transformed to be symmetric with respect to an arbitrary point.

The feature vector 0803 represents a difference between the person data 0801 and other person data, so that if the feature vector 0803 is processed so as not to distinguish it from the other person data 0802, it can be said that features are removed. In FIG. 9, a hyper-plane within a feature space is set as shown in FIG. 10, and a symmetry transformation is performed such that person data 0901 is included in the distribution of a collection 0902 of other person data to generate a feature vector 1003 after the transformation. Alternatively, a rotational transformation may be performed about an arbitrary point in the feature space, as shown in FIG. 11, to generate a feature vector 1103 after the transformation.

As a result, characteristic elements of detected person data, for example, sex, age, age group, hair style, closing, skin color, hair color, color of closing, shape of head, differences in expression when a person wears glasses or not, when the person wears a face mask or not, or when the person wears accessories or not, or when the person has moles or not, and the like are modified or replaced with other features. In this way, individual's privacy information is processed.

Figure 14:
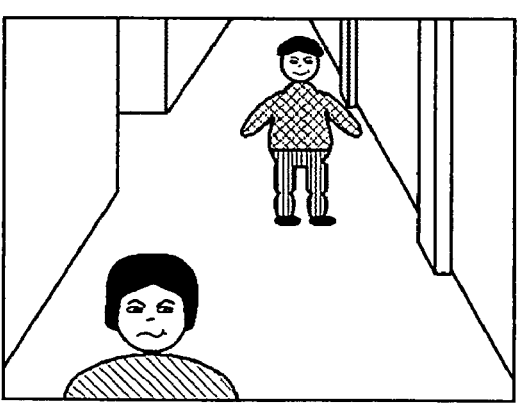
FIG. 14 is a diagram illustrating an image in which personal features are replaced.

FIG. 14 is a diagram illustrating an image which is generated by detecting the images of faces, which constitute persons' features, in the person detection processing step 0201, extracting entire face images as features in the feature extraction processing step 0202, replacing the entire extracted features with features of other persons in the feature amount processing step 0204, and combining the resulting image with the image stored in the image storage unit 102 to change the face images which constitute individuals' privacies.

Third Embodiment

In the following, an image processing apparatus and method according to the present invention will be described with reference to FIG. 16.

Figure 16:
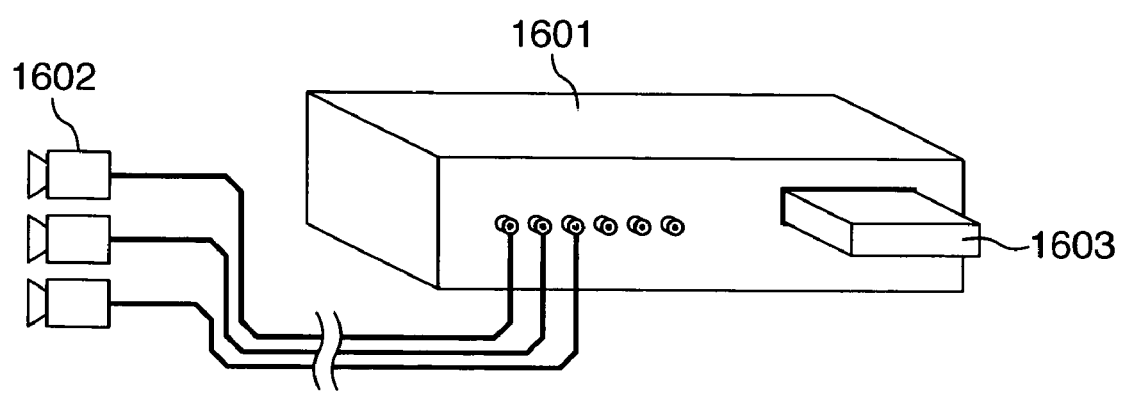
FIG. 16 is a diagram illustrating a multi-camera monitoring system which has an exchangeable image database.

FIG. 16 is a diagram generally illustrating the configuration of the image processing apparatus according to the third embodiment.

In FIG. 16, the image processing apparatus 1601 of the present invention comprises an exchangeable image database 1603, and a plurality of imager devices 1602.

The distribution of person data stored in the image database 1603 causes a change in the result of the principal component analysis and eigenvalue calculation performed in the feature extraction processing step 0202, so that different features should be processed.

For example, when the image processing apparatus is installed in an accessory section of a department store populated with young female customers, an image database, which has a large proportion of person data related young women, is used as an image database 1603 to obtain more suitable features which are calculated from principal components and eigen values. By deleting a feature amount with axes representing the principal component and eigen values, the amount of feature can be less reduced for young women, while the amount of feature can be more reduced for other persons.

In other words, the individuals' privacies can be protected as suitable to each store by exchanging the image database 1603 in accordance with the type of customers of the store.

Fourth Embodiment

In the following, an image processing apparatus and method according to a fourth embodiment of the present invention will be described with reference to FIGS. 17 and 18.

Figure 17:
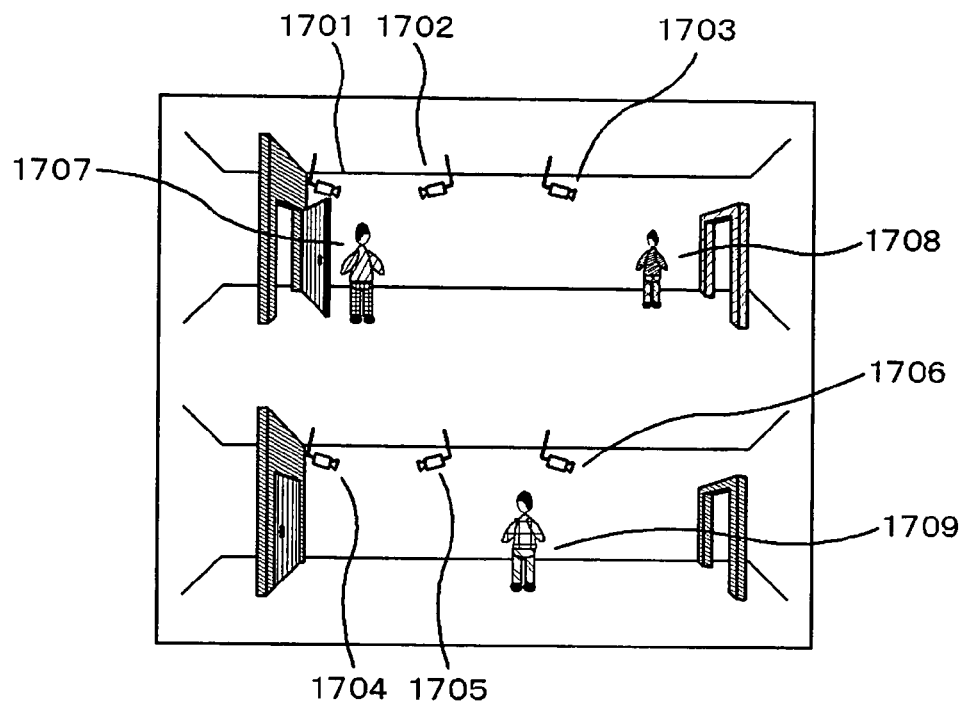
FIG. 17 is a diagram illustrating a plurality of monitoring cameras installed in a building.
Figure 18:
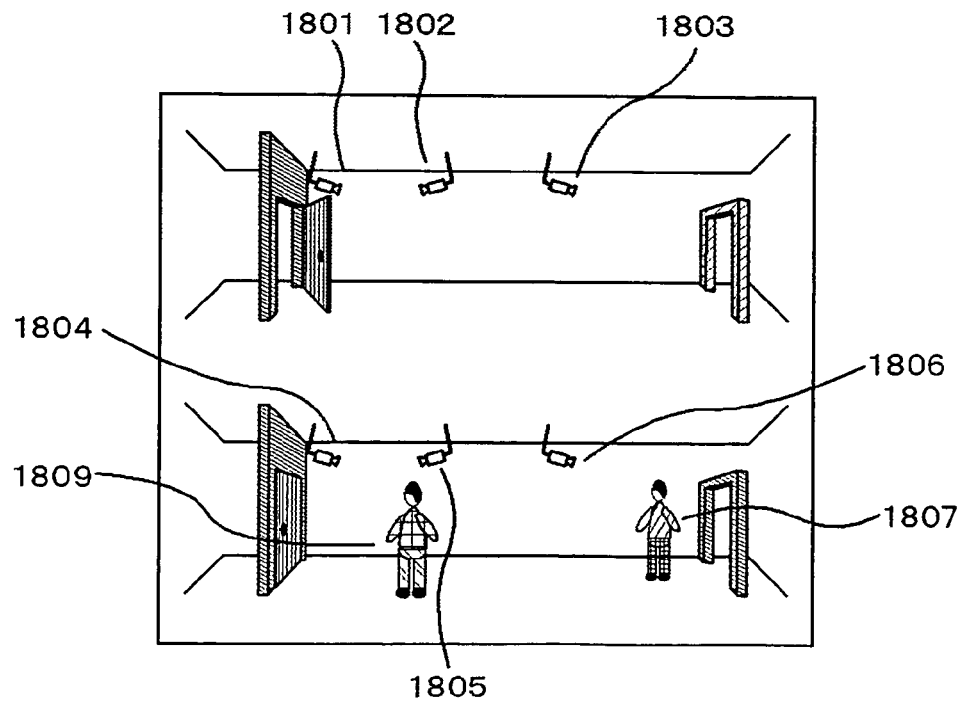
FIG. 18 is a diagram illustrating the interior of the building at a different time from FIG. 17.

FIGS. 17 and 18 are diagrams generally illustrating the configuration of the fourth embodiment of the present invention.

In FIGS. 17 and 18, a plurality of monitoring cameras 1701, 1702, 1703, 1704, 1705, 1706, 1801, 1802, 1803, 1804, 1805, 1806 are installed in a building. The building is monitored for persons 1707, 1708, 1709, 1807, 1809 within the building using the monitoring cameras. Also, FIGS. 17 and 18 show that a person 1707 observed by the monitoring camera 1703 in FIG. 17 is monitored at a different time at a different location by a different camera as a person 1807 observed by the monitoring camera 1806 in FIG. 18.

Images captured by the monitoring cameras are sent to the image processing apparatus of the present invention, and outputted after person's privacy information is processed. The outputted images are monitored by a guard. When an image database is shared in the same building, the person's privacy information is processed by a common method, so that apparent changes are consistent in the same individual, thus enabling the guard to identify the same person captured by a plurality of cameras.

In this way, the same person can be tracked among a plurality of cameras, and the flow of persons can be measured without capturing images of individuals themselves, so that the individuals' privacies can be protected.

Fifth Embodiment

Next, an image processing apparatus and method according to a fifth embodiment of the present invention will be described with reference to FIG. 19.

Figure 19:
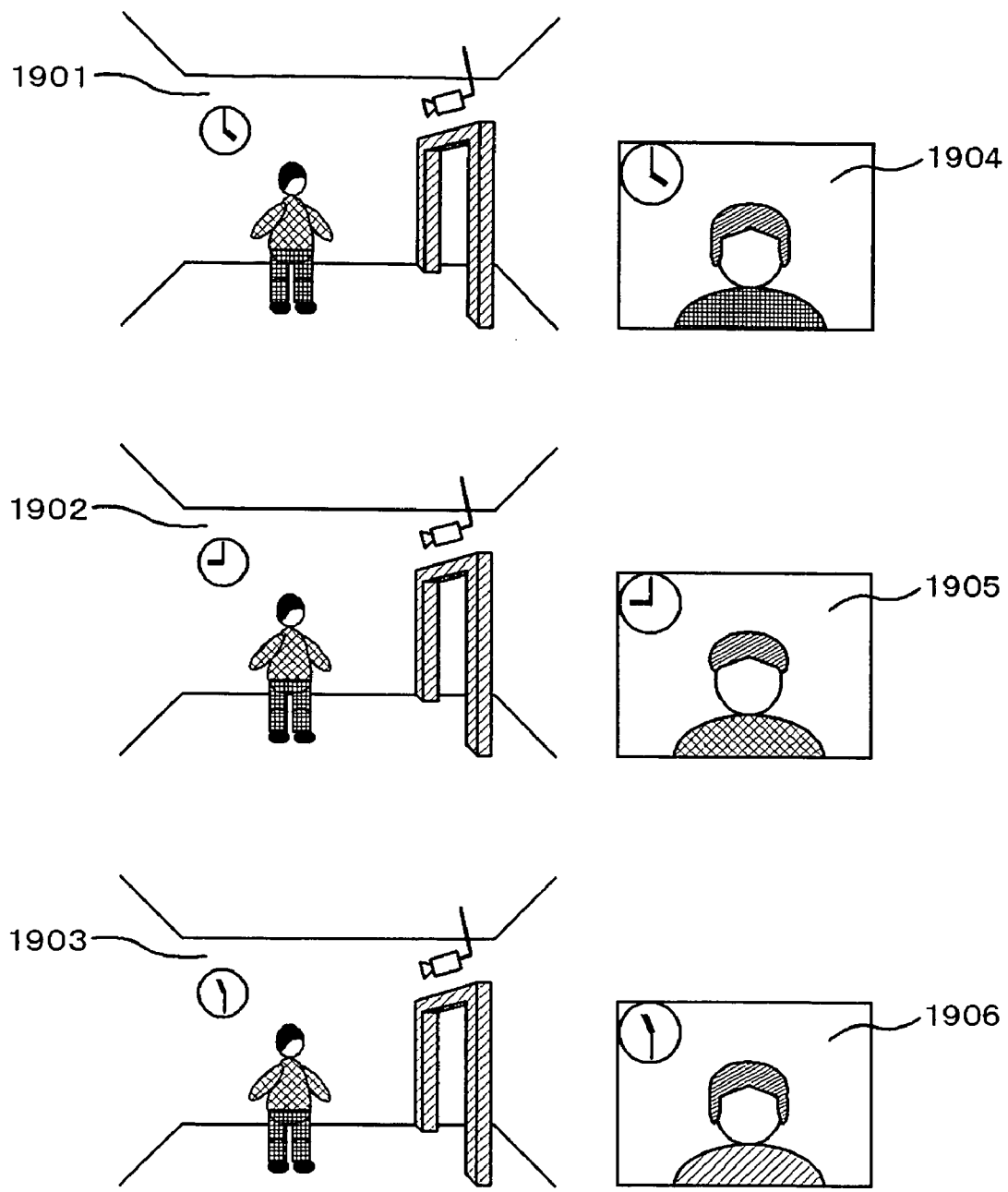
FIG. 19 is a diagram illustrating different types of image processing performed at different times.

FIG. 19 is a diagram illustrating the fifth embodiment of the present invention.

In a collective residence such as an apartment house, for example, a limited number of persons alone pass through a space under monitoring, so that if images are processed in the same way for the same person at all times as in the fourth embodiment, a life pattern of an individual, and the like can be found while the space is monitored for a long time. Since this can identify an individual corresponding to processed images, the database 103 may be switched from one time to another, or the feature amount, described in the second embodiment, may be replaced in accordance with different rules from one time to another.

FIG. 19 illustrates monitored images 1904, 1905, 1906 after privacy information has been processed at corresponding times for the space under monitoring 1901, 1902, 1903 at different times.

The embodiments according to the present invention can delete or modify individuals' privacy information, while the identity of a person can be determined among a plurality of cameras, to protect individuals' privacies in a monitoring system, a person flow measuring system and the like which employ monitoring cameras, security cameras and the like.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image processing apparatus for processing an image captured by an imager device to output the processed image, comprising:
    a first imaging means for capturing a first image;
    a second imaging means for capturing a second image;
    a person detecting means for detecting a person within the first image and the second image;
    a storage means for storing feature information for use as a database;
    a feature extracting means for extracting a feature from the person detected by the person detecting means, and for extracting stored feature information on the feature from the database;
    a feature amount processing means for processing the feature, using a feature amount extracted by the extracting means from within the stored feature information on the feature; and
    an output image generation means for generating an output image based on the processed feature;
    wherein the processing means for processing the feature, using a feature amount includes processing for replacing the feature amount with a value calculated from the feature amount using a function; and
    wherein the function of calculating a value to be substituted for the feature amount receives a time or an operating time of the apparatus as an input parameter, and a value calculated with the same feature amount inputted to the processing means varies depending on the time or the operating time of the apparatus.

2. An image processing apparatus according to claim 1, wherein:
    the person detecting means detects the head of a person.

3. An image processing apparatus according to claim 1, wherein:
    the feature extracted from a detected person is from a group of features including face image, sex, age, age group, hair style, clothing, skin color, hair color, color of closing, shape of the head, whether the person wears glasses, whether the person wears a face mask, whether the person wears accessories, whether the person has a mole, shape of mustache, and mustache color.

4. An image processing apparatus according to claim 1, wherein:

the feature extracted from a detected person is represented by a feature element within the database which stores feature information.

5. An image processing apparatus according to claim 1, comprising:

means having a plurality of databases recorded thereon for storing feature information and switching the databases.

6. An image processing apparatus according to claim 1, comprising:

means for switching the database for storing feature information such that part or entirety of the database is utilized.

7. An image processing apparatus according to claim 1, wherein:

the database for storing feature information is recorded in an exchangeable recording medium.

8. An image processing apparatus according to claim 1, wherein:

the function of calculating a value to be substituted for the feature amount can be manually changed to change the value calculated with the same feature amount inputted to the processing means.

9. An image processing apparatus according to claim 1, wherein:

the person detecting means includes at least one mathematical computation from the group including a Sobel filter, a Laplace filter, a Hough transform, and a first-order differentiation.

10. An image processing apparatus according to claim 1, wherein:

any differences between the feature of the detected person and the feature of the extracted stored feature information on the feature from the database are represented in a feature vector.

11. An image processing apparatus according to claim 1, wherein:

a feature amount processing means removes the feature of the detected person, before the output image generation means generates an output image.

* * * * *